April 14, 1931. J. C. WOODFORD 1,801,032
RETARDING DEVICE
Filed Feb. 11, 1929 2 Sheets-Sheet 1

Inventor
Joseph C. Woodford
By Owen & Owen
Attorneys

April 14, 1931.  J. C. WOODFORD  1,801,032
RETARDING DEVICE
Filed Feb. 11, 1929  2 Sheets-Sheet 2

Inventor
Joseph C. Woodford
By Owen & Owen
Attorneys

Patented Apr. 14, 1931                                                    1,801,032

UNITED STATES PATENT OFFICE

JOSEPH C. WOODFORD, OF BRYAN, OHIO, ASSIGNOR TO SERVICE STATION EQUIPMENT COMPANY, OF BRYAN, OHIO, A CORPORATION OF OHIO

RETARDING DEVICE

Application filed February 11, 1929. Serial No. 339,058.

This invention relates to a device for retarding the movement of a driven member, with special reference to its application to a rotary member driven by a spring motor, such as is used in air service equipment and the like.

Whenever a movable element is driven by a continuously applied force, particularly if a spring motor is used, there is always a tendency for the speed or momentum of the driven member to become excessive. For example, when a spring motor is used for reeling up an air hose, the cumulative effect of the spring often causes the nozzle to strike the drum housing with great force, causing excessive wear and tear and sometimes resulting in considerable damage.

The object of my present invention is to provide a retarding device adapted to be used under the above or similar circumstances to regulate the action of the driven member and positively prevent it from exceeding a predetermined maximum speed. Adjustable means may also be provided to vary at will the maximum speed which may be attained by the driven member.

The specific construction of my invention, in its preferred embodiment, will be more particularly explained in connection with the accompanying drawings, in which Figure 1 is a side elevation with parts broken away, showing the invention applied to air service equipment.

Figure 1:
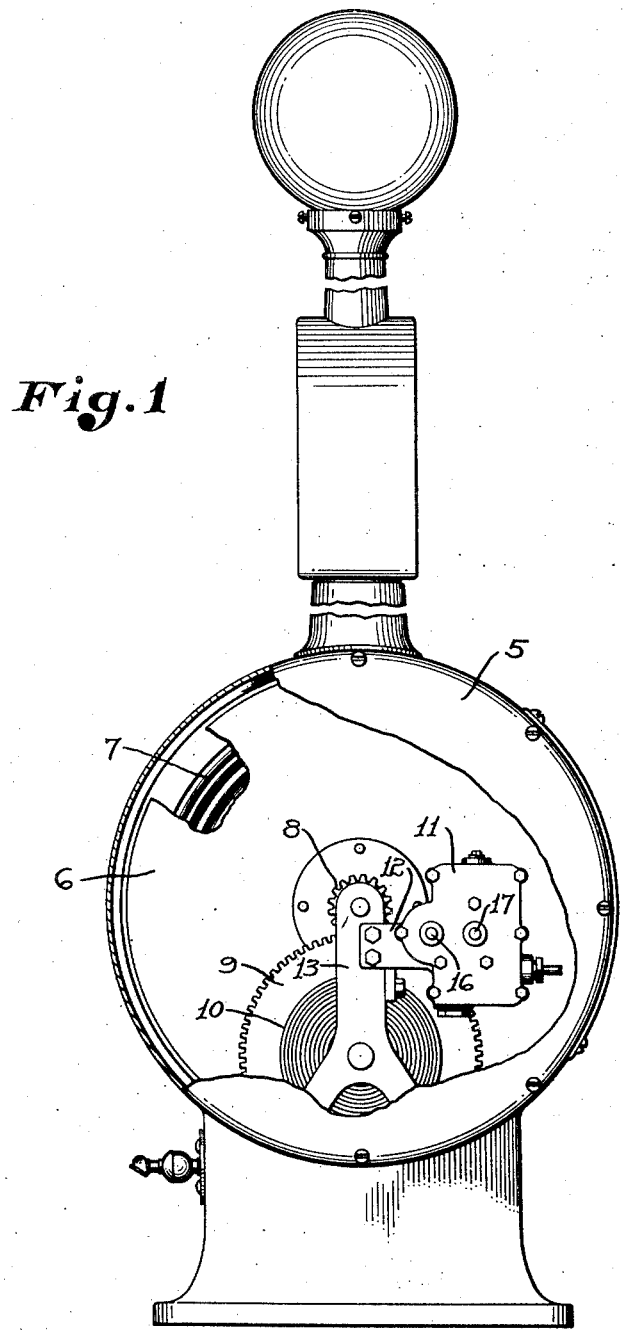

In its present adaptation, the invention is applied to air service equipment comprising a housing 5 within which is rotatably mounted a drum 6 adapted to carry an air hose 7. A pinion 8 is secured in fixed relation to the drum 6 and meshes with a gear 9 to which is connected a clock spring 10. When the air hose is drawn out, the drum 6 is rotated to wind up the spring 10 and the spring acts to again wind the hose on the drum as soon as it is released.

As illustrated in the drawings, the invention is connected with the member 9 to retard the movement of the latter when it is driven by the spring 10. The invention employs a rotary pump which is connected to the driven member and arranged to pump oil, or other liquid having similar properties, in a course which includes a restricted passageway which sets up a back pressure to partially counteract the driving force exerted upon the driven member and to retard the latter. In the present instance, the pump is mounted within a closed housing 11 having a bracket arm 12 projecting therefrom and secured to a bearing bracket 13 in which the driven member 9 rotates. The housing 11 is adapted to contain oil or other non-corrosive liquid, the viscosity of which is little affected by variations in temperature.

The pump comprises intermeshing gears 14 and 15 secured to shafts 16 and 17 respectively, and one of these shafts, as 17, is extended through the housing and has secured thereto a pinion 18 which meshes with the driven member 9. The shaft 17 is surrounded by a suitable packing gland 19 to prevent escape of the liquid from the housing. The housing has a filler opening adapted to be closed by a plug 20 and a drainage outlet adapted to be closed by a plug 21.

The gear 14 is partially enclosed within a recess 22 in the housing and the gear 15 is likewise partially enclosed by a casing 23 which has an extension 24 constituting a partition which separates the liquid beneath the intermeshing teeth of the gears 14 and 15 from the rest of the liquid in the housing, except for a restricted passageway 25. A needle valve 26 controls the amount of liquid which may pass through the passageway 25, and has a screw adjustment 27. The end of this needle valve extends outwardly from the housing through a packing gland 28, whereby it may be easily adjusted to obtain the best results.

Figure 2:
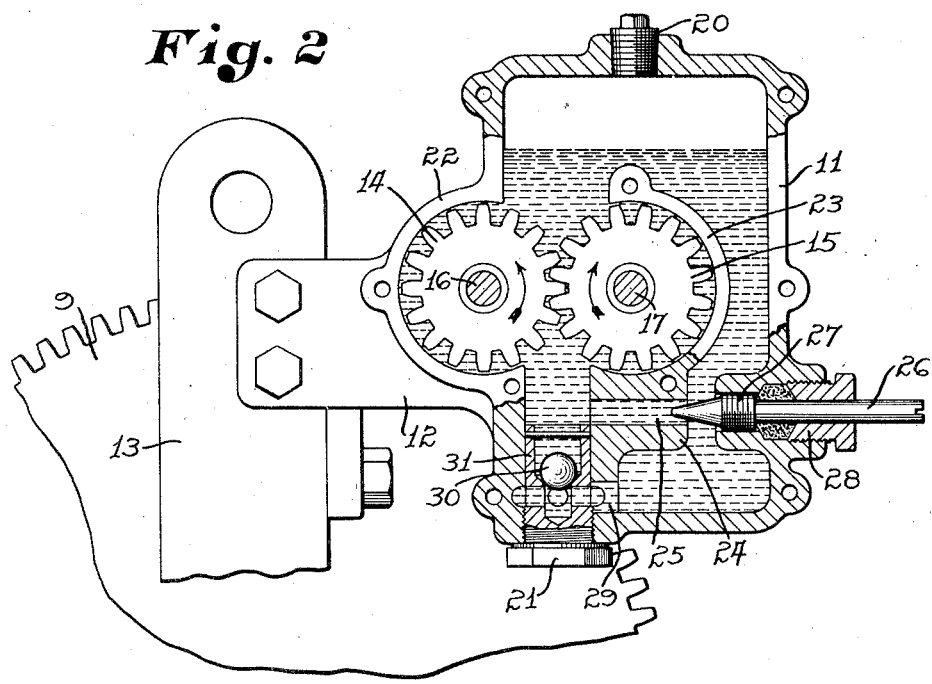
Figure 2 is a longitudinal sectional view, illustrating the invention on an enlarged scale.
Figure 3:
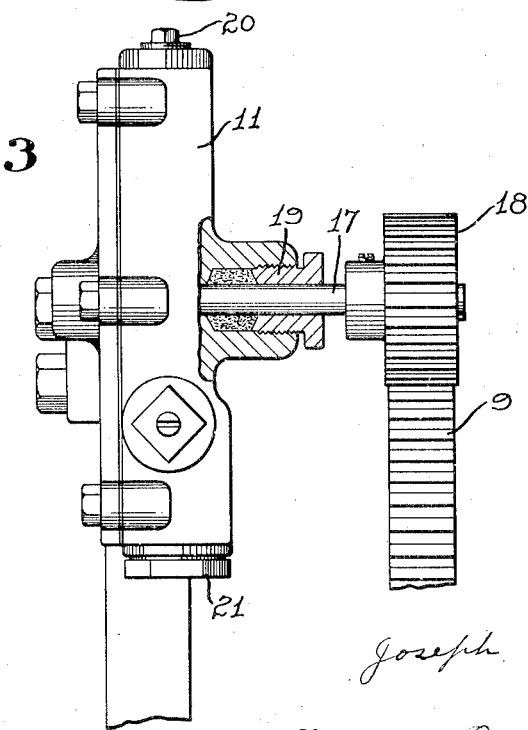
Figure 3 is a detail view showing the connection of the retarding device with the driven member.

When the air hose 7 has been withdrawn from the housing 5 and then released, the spring 10 drives the gear 9 and causes the drum 6 to rotate to again wind up the hose and drives the gears 14 and 15 in the direction indicated by the arrows in Figure 2. This causes the liquid to be carried downwardly with the gear teeth within the pockets 22 and 23 and to be forced through the passageway 25. The rate of flow through this passageway, as controlled by the adjustment of the needle valve 26, determines the maximum speed at which the drum 6 may rotate.

When the hose 7 is withdrawn, the gears 14 and 15 rotate in the opposite direction and pump the liquid in the opposite direction through the pocket 22 and 23. In order to prevent the pump from exerting any resistance against the unwinding of the hose, the partition 24 is provided with a by-pass 29 which is controlled by a check valve 30 mounted within a cage 31, so that the liquid may circulate freely in this direction but will be prevented from circulating in the opposite direction except what passes through the restricted passageway 25.

From the foregoing description, it will be seen that I have provided means for positively preventing the member 9 from being driven too rapidly under the influence of the spring 10. This retarding means may be adjusted by means of the needle valve 26, to obtain any effect desired. While I have described the invention especially with reference to its application to the control of a spring operated drum used in air service equipment, it is obvious that the same principle may be applied to the retardation of any driven member. It will also be seen that various modifications may be made in the construction of the details of the invention without any material departure from the principles upon which it is based. It is my intention, therefore, to include all such modifications in the scope of the appended claims.

What I claim is:

1. The combination with a rotatable member, of a housing adapted to contain liquid and having a pocket in one side thereof, a partition extending from one side of the housing part way across the same and formed with a pocket opposed to the first mentioned pocket, the space between the free edge of said partition and the opposite wall of the housing being unobstructed, said partition being below the normal level of the liquid, a pair of intermeshing gears in said pockets, and means operatively connecting one of the gears to said rotatable member, said partition having a restricted opening therethrough below said gears, whereby the pressure of the liquid carried by the teeth of said gears into the space below them will limit the rotation of the gears to the rate at which the liquid can be forced through said restricted opening.

2. The combination with a rotatable member, of a housing adapted to contain liquid, and having a pocket in one side thereof, a partition extending from the bottom of the housing part way to the top thereof and formed with a pocket opposed to the first mentioned pocket, the space between the top of the partition and the top of the housing being unobstructed, said partition being below the normal level of the liquid, a pair of intermeshing gears in said pockets, means operatively connecting one of the gears to said rotatable member, said partition having a restricted opening therethrough below said gears, whereby the pressure of the liquid carried by the teeth of said gears into the space below them will limit the rotation of the gears to the rate at which the liquid can be forced through said restricted opening, and a valve in alinement with said opening and adjustable from outside the housing to vary the restriction.

3. The combination with a rotatable member, of a housing adapted to contain liquid, and having a pocket in one side thereof, a partition extending from the bottom of the housing part way to the top thereof and formed with a pocket opposed to the first mentioned pocket, the space between the top of the partition and the top of the housing being unobstructed, said partition being below the normal level of the liquid, a pair of intermeshing gears in said pockets, means operatively connecting one of the gears to said rotatable member, said partition having a restricted opening therethrough below said gears, whereby the pressure of the liquid carried by the teeth of said gears into the space below them will limit the rotation of the gears to the rate at which the liquid can be forced through said restricted opening, and a by-pass through said partition below the gears and provided with a check valve which opens only when the gears rotate in a reverse direction.

4. The combination with a rotatable member, of a housing adapted to contain liquid, and having a pocket in one side thereof, a partition extending from the bottom of the housing part way to the top thereof and formed with a pocket opposed to the first mentioned pocket, the space between the top of the partition and the top of the housing being unobstructed, said partition being below the normal level of the liquid, a pair of intermeshing gears in said pockets, means operatively connecting one of the gears to said rotatable member, said partition having a restricted opening therethrough below said gears, whereby the pressure of the liquid carried by the teeth of said gears into the space below them will limit the rotation of the gears to the rate at which the liquid can be forced through said restricted opening, a needle valve extending through the wall of the housing in alinement with said opening and adjustable to vary the restriction, and a by-pass through said partition below the gears and provided with a check valve which opens upwardly only when the gears rotate in a reverse direction.

In testimony whereof I have hereunto signed my name to this specification.

JOSEPH C. WOODFORD.